J. M. WALKER.
FERTILIZER DISTRIBUTER.
APPLICATION FILED JULY 3, 1913.
1,090,356.
Patented Mar. 17, 1914.
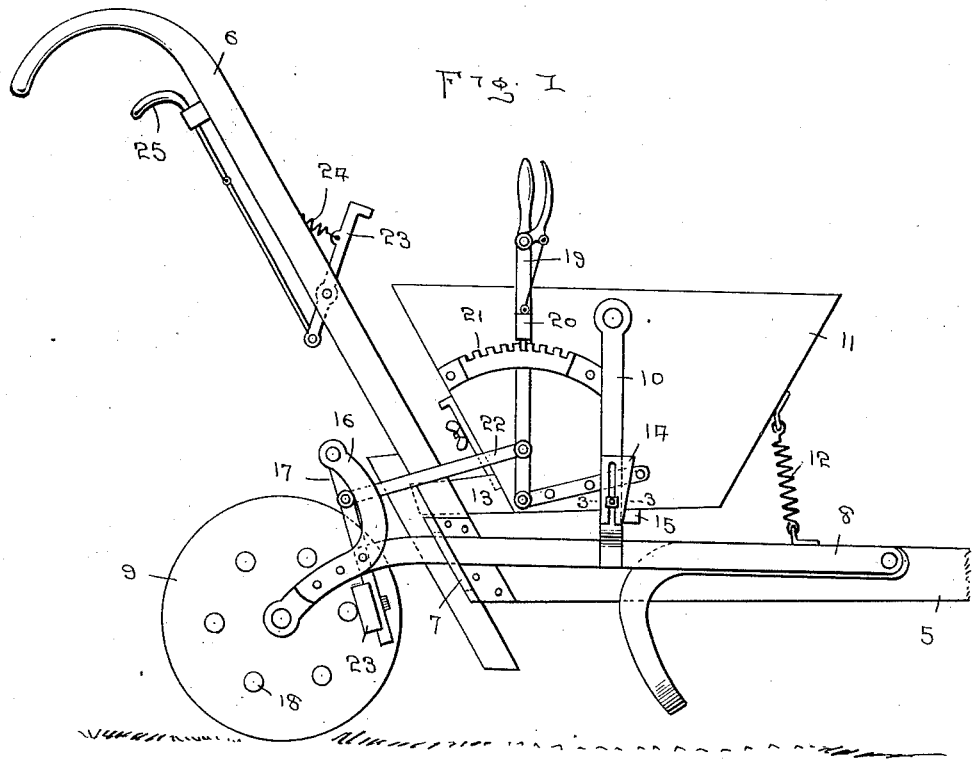
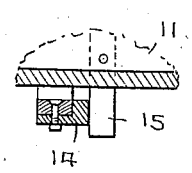
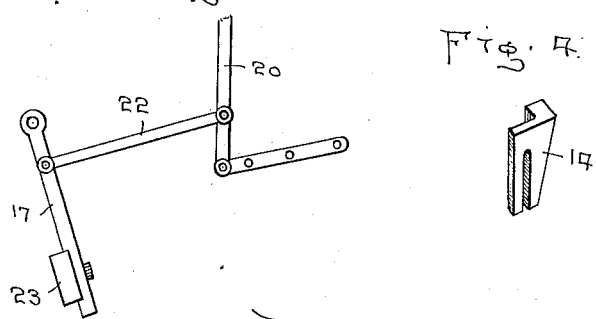
Witnesses
Inventor
J. M. Walker
By W. J. FitzGerald & Co.
Attorneys

UNITED STATES PATENT OFFICE.

JAMES MONROE WALKER, OF CARROLLTON, GEORGIA, ASSIGNOR OF ONE-FOURTH TO W. W. BASKIN, ONE-FOURTH TO W. T. HERRIN, AND ONE-HALF TO JOHN M., J. R., TOMMY AND MATTIE WALKER.

FERTILIZER-DISTRIBUTER.

1,090,356. Specification of Letters Patent. Patented Mar. 17, 1914.

Application filed July 3, 1913. Serial No. 777,261.

*To all whom it may concern:*

Be it known that I, JAMES MONROE WALKER, a citizen of the United States, residing at 86 Dixie street, Carrollton, in the county of Carroll and State of Georgia, have invented certain new and useful Improvements in Fertilizer-Distributers; and I do hereby declare the following to be a full, clear, and exact description of the invention, such as will enable others skilled in the art to which it appertains to make and use the same.

This invention relates to fertilizer distributers especially adapted for distributing guano.

An object of the invention is to provide a vibrating hopper actuated from the wheel of the distributer for inducing a continuous flow of fertilizer.

Another object is to provide means for regulating the extent of the vibrations of the hopper, and consequently the flow of fertilizer.

A further object is to provide means for limiting the vibratory movement of the hopper and for directing such movement.

In the accompanying drawing wherein is illustrated the preferred embodiment of my invention, Figure 1, represents a side elevation of the distributer. Fig. 2, represents a detail view of the vibrating mechanism. Fig. 3, represents a sectional view on the line 3—3 of Fig. 1. Fig. 4, represents a perspective view of an adjustable key member for limiting the movement of the hopper Referring to the drawing wherein similar reference numerals designate corresponding parts throughout the several views, 5 indicates the beam of a cultivator or distributer having the usual handles 6, secured at their lower ends to the beam 5, and to a bracket 7, having suitable slots therein for receiving and limiting the movement of the parts of the frame 8, which is pivoted at its forward end to the beam 5 and carries at its rear end a rotatable wheel 9. A pair of uprights 10, are secured to the parts of the wheel frame 8, and pivotally receive between their upper ends the hopper 11, which latter is normally held downwardly at its forward end by a spring 12. The hopper 11, is adapted to contain the desired fertilizer which is dropped through the usual spout 13. Keys 14, are secured for vertical adjustment on the uprights 10, and adapted to engage the stop bar 15, secured to the under side of the hopper 11. The faces of the keys 14, which engage the stop bar 15, are inclined to the vertical, whereby suitable adjustment of said keys will give the desired pitch or tilt to the hopper. An upwardly and rearwardly extending arm 16, is secured adjacent the rear end of the frame 8, and carries a pivoted vibrating lever 17. The side of the wheel 9, adjacent the part of the frame 8, which carries the arm 16, is provided with a plurality of pins 18 arranged at equal radial distances from the axis thereof. While a wheel having pins thereon is here shown, it will be understood that a ratchet or star wheel may be substituted therefor. A hand lever 19, is secured to the hopper 11, and is adapted to be secured in adjusted position by a suitable locking device 20, engaging in a segmental rack 21. The vibrating lever 17, is normally held at its free end, engaging the pins 18 by the tension of the spring 12, a link 22 being employed to connect the hand lever 19, with said vibrating arm. A block or abutment 23, is removably secured adjacent the free end of the vibrating lever 17, whereby each of the pins striking said lever and abutment will impart two vibrations thereto.

In operation, rotation of the wheel 9, successively engages the pins 18 thereof against the vibrating lever 17 and abutment 23, vibrating the latter together with the hopper 11, which is connected with said lever by the link 22. For decreasing the extent of the vibrations or for withdrawing the lever 17 from the pins of the wheel, the hand lever 19 is moved forwardly, and for increasing the violence of the vibration, the lever 19 is moved rearwardly, as will be understood. For limiting the vibratory movement of the hopper the keys 14, are moved downwardly, this adjustment also tilts the hopper 11 rearwardly. A latch bar 23 is pivoted to one of the handles 6, and is normally held up over the hopper 11, by a spring 24. A handle 25, is adapted to be operated to lower the free end of the latch bar 23 and engage and depress the adjacent end of the hopper 11, and consequently withdraw the vibrating lever 17, from operative engagement with the wheel 9.

What I claim is:

1. A fertilizer distributer comprising a wheel mounted frame, a hopper pivoted thereover, means for holding the forward end of said hopper downward, adjustable means for limiting the downward movement of the forward end of said hopper, and means adapted to coöperate with the wheel of said frame to vibrate said hopper.

2. A fertilizer distributer comprising a wheel mounted frame, uprights secured to said frame, a hopper pivoted between said uprights, a stop bar carried by said hopper, and members adjustably secured to said uprights for adjustably limiting the movement of said hopper.

3. A fertilizer distributer comprising a wheel mounted frame, a hopper pivoted thereover, a lever pivoted to said frame, an abutment secured to said lever, pins carried by the wheel of said frame and adapted to successfully engage said abutment and the end of said lever, and connections between said lever and said pivoted hopper.

In testimony whereof I have signed my name to this specification in the presence of two subscribing witnesses.

JAMES MONROE WALKER.

Witnesses:
W. A. LYLE,
J. J. REESE.